United States Patent [19]
Shida

[11] Patent Number: 5,515,412
[45] Date of Patent: May 7, 1996

[54] METHOD OF PRODUCING FRIT-SEALED X-RAY TUBE

[76] Inventor: Yūsuke Shida, 1-21-2 Obadai, Minamitstsujigaoka, Kameoka City, Kyoto, Japan

[21] Appl. No.: 251,728

[22] Filed: May 31, 1994

[51] Int. Cl.⁶ .................................................. H01J 35/02
[52] U.S. Cl. ......................................... 378/121; 378/140
[58] Field of Search ............................... 378/119, 121, 378/140

[56] References Cited

U.S. PATENT DOCUMENTS

| | | | |
|---|---|---|---|
| 2,029,584 | 2/1936 | Pieper | 338/73 |
| 2,431,277 | 11/1947 | Pressel et al. | 174/50.63 |
| 2,564,950 | 8/1951 | Black | 428/433 |
| 3,500,097 | 3/1970 | Perry et al. | 378/148 |
| 3,553,514 | 1/1971 | Berends | 378/200 |
| 3,884,007 | 5/1975 | Thoman | 313/256 |
| 4,208,577 | 6/1980 | Wang | 250/214 VT |
| 4,861,977 | 8/1989 | de la Fonteijńe | 250/214 VT |

FOREIGN PATENT DOCUMENTS

| | | |
|---|---|---|
| 0411492 | 6/1991 | European Pat. Off. . |
| 1127607 | 9/1968 | United Kingdom . |

*Primary Examiner*—David P. Porta
*Assistant Examiner*—David Vernon Bruce
*Attorney, Agent, or Firm*—Price, Gess & Ubell

[57] ABSTRACT

A frit-sealed x-ray tube includes a glass bulb that supports metallic parts including an anode with a target and a beryllium window. Joint materials are provided of metal with thermal expansion coefficients that approximate the thermal expansion coefficient of the glass bulb. Frit materials having compositions of primarily zinc oxide and lead oxide are used and also have a thermal expansion coefficient that approximates the thermal expansion coefficients of the glass bulb and the joint materials. The frit materials allow a heat resistant and vacuum resistant welding between the glass bulb and the joint materials.

1 Claim, 4 Drawing Sheets

METHOD OF PRODUCING FRIT-SEALED X-RAY TUBE

BACKGROUND OF THE INVENTION AND DESCRIPTION OF THE PRIOR ART

In the conventional method of sealing metallic parts in an X-ray Lube made of glasses, a glass bulb is made closer to a metallic joint of an anodic part and a beryllium window part in thermal expansion coefficient and they are simultaneously heated with a powerful fire to directly weld glasses to metals. However, a serious problem has occurred in that a difficult and dangerous operation requiring great skill is required with an increase in size and the productivity cannot be always improved even though a quantity is increased.

OBJECT AND SUMMARY OF THE INVENTION

So, it is an object of the present invention to provide an art capable of simply sealing various kinds of metallic part in a glass bulb by everyone without requiring special skill even though an X-ray tube is increased in size. In order to achieve the above described object, according to the present invention, it is essential as in the conventional art that said glass bulb is made closer to a metallic joint to be sealed to the glass bulb in thermal expansion coefficient to prevent glasses from being cracked due to a strain remaining after sealing. Subsequently, welding agents having both a heat resistance and a vacuum resistance capable of sufficiently bearing high-temperature atmospheres in a process of sealing a cathode and an exhaust process after simply welded to both the glass bulb and the metallic joint have been investigated and at last the suitable beat-resistant and vacuum-resistant sealing of the metallic joint to two kinds of glass could be achieved by the use of the optimal frit mainly comprising lead oxide powders and the like.

As a result, a process of producing an X-ray tube could be remarkably simplified and thus a cost could be remarkably reduced.

DETAILED DESCRIPTION OF THE INVENTION

Figure 1:
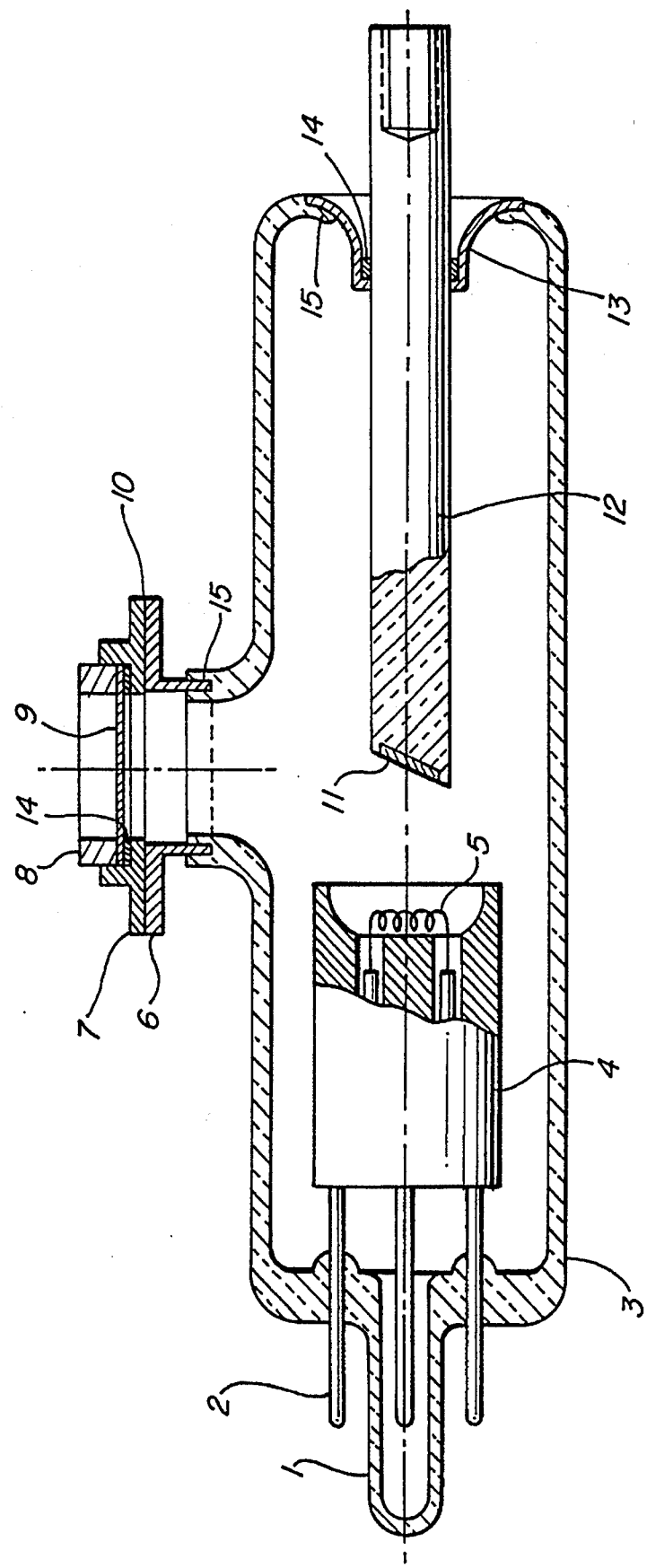
FIG. 1 is a cross-sectional view of a prior art x-ray tube.

FIG. 1 shows the conventional method.

All of places where the metallic parts are sealed to the glass bulb are produced by the method of heating both glasses and metals with a powerful fire to directly weld glasses to metals. That is to say, the remarkably high level of glass work has been required. In addition, although various kinds of X-ray tube have been on the market, methods of sealing the metallic parts to the glass bulb are all almost similar, so that it is omitted to list many conventional methods.

Figure 2:
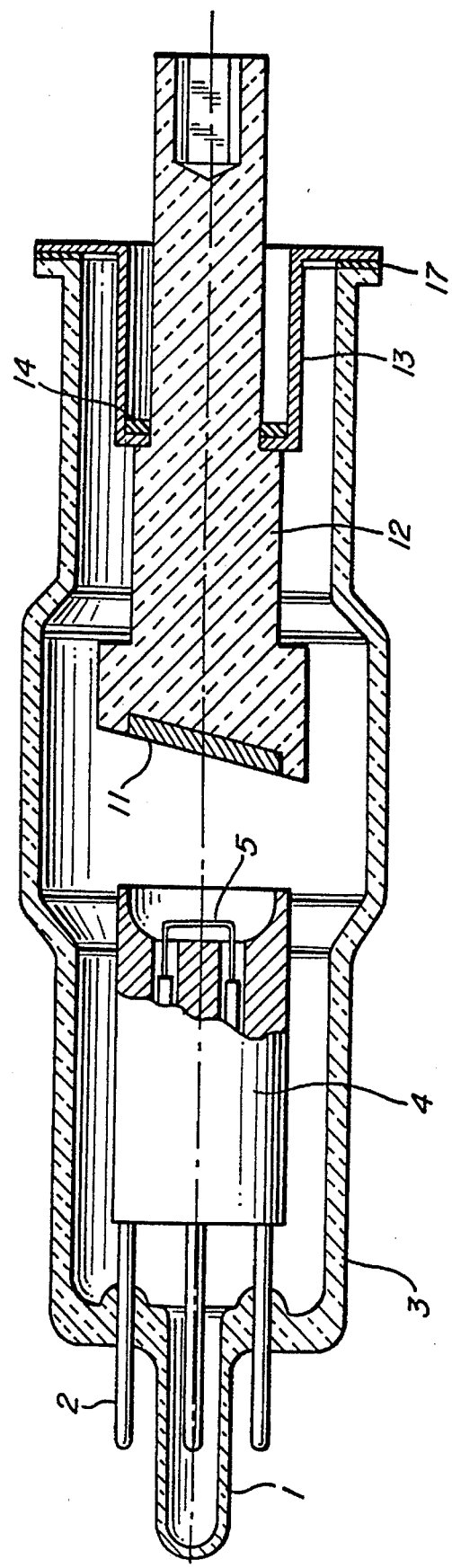
FIG. 2 is a cross-sectional view of a first embodiment of an x-ray tube of the present invention.

[Description of Reference Numerals]
1. Exhaust tube
2. Kovar pin
3. Kovar-glass bulb
4. Cathode part
5. Filament
6. Kovar joint-ring
7. Kovar rim
8. Kovar ring
9. Beryllium window
10. Press weld
11. Tungsten target
12. Cupreous anode
13. Kovar joint
14. Soldering
15. Direct weld of glass and metal FIG. 2 is a sectional view showing a preferred embodiment of the present invention in which a cupreous anode having a tungsten Larger provided with a Kovar, joint-ring soldered to a base thereof is mounted on a Kovar-glass bulb by the frit coating.

Figure 3:
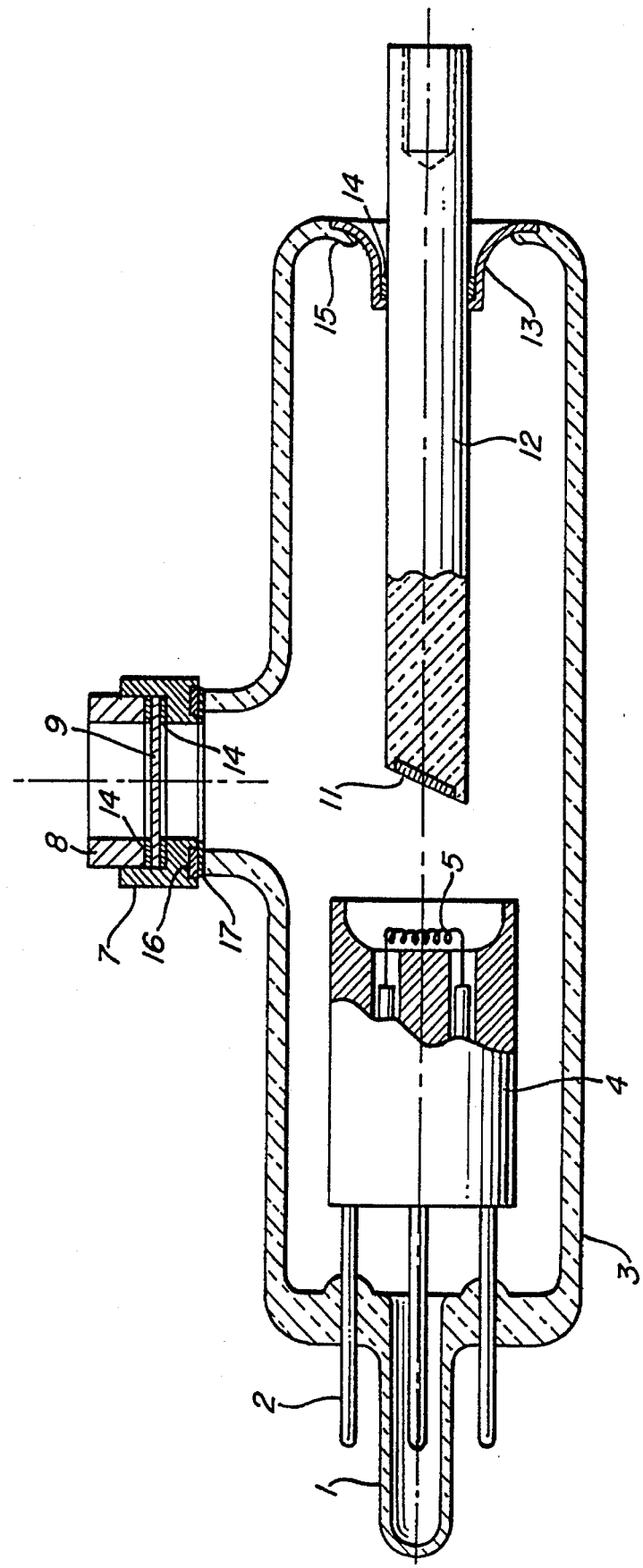
FIG. 3 is a cross-sectional view of a second embodiment of an x-ray tube of the present invention.

[Description of Reference Numerals]
1. Exhaust tube
2. Kovar pin
4. Cathode part
5. Filament
3. Kovar-glass bulb
11. Tungsten target
12. Cupreous anode
14. Soldering
13. Kovar joint
17. Frit sea FIG. 3 is a sectional view showing a preferred embodiment of the present invention in which a Kovar rim provided with a beryllium window preliminarily soldered thereto is mounted on a Kovar-glass bulb by the frit coating. In addition, although it is not shown, also a sealing at two spots, which may be called a combination of FIG. 2 with FIG. 3, is possible by devising a frit-sealing furnace.

Figure 4:
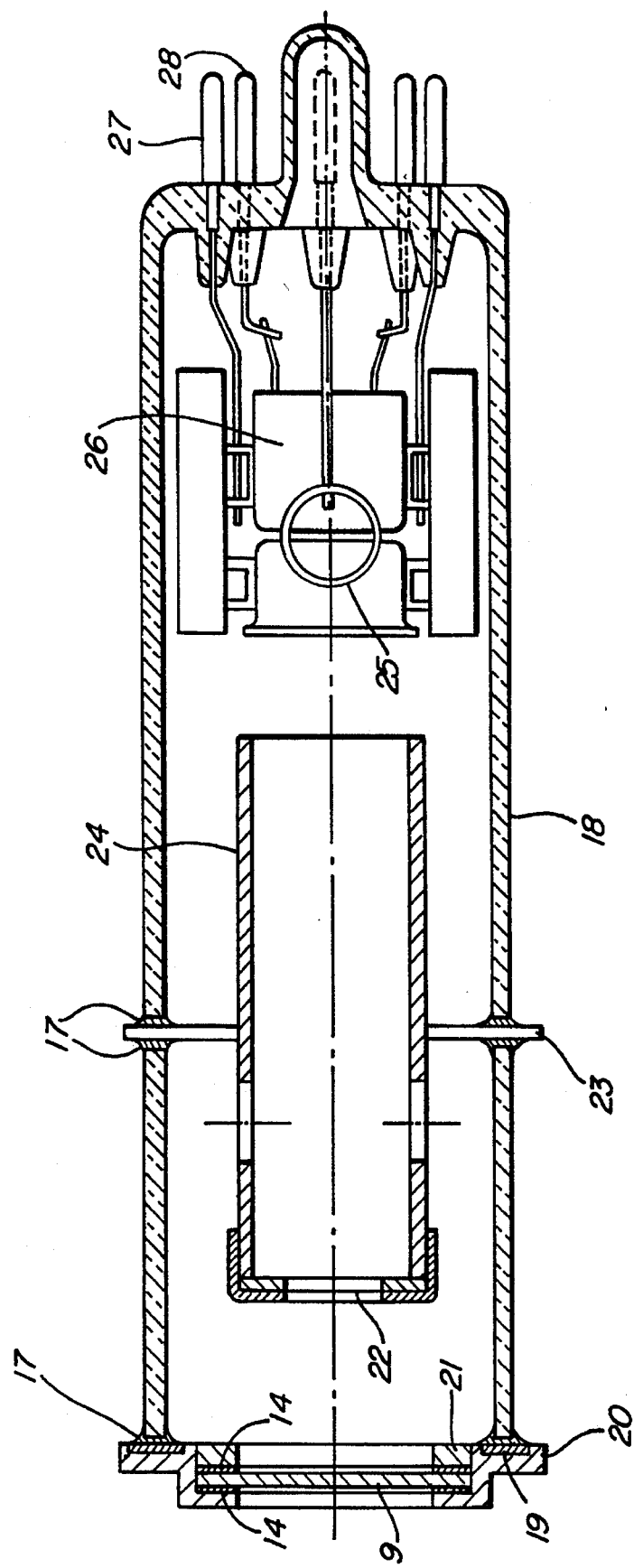
FIG. 4 is a cross-sectional view of a third embodiment of an x-ray tube of the present invention.

[Description of Reference Numerals]
1. Exhaust tube
2. Kovar pin
3. Kovar-glass bulb
4. Cathode part
5. Filament
7. Kovar rim
8. Kovar ring
9. Beryllium window
17. Frit seal
11. Tungsten target
12. Cupreous anode
13. Kovar joint
14. Soldering
15. Direct weld of glass and metal
16. Kovar-glass coating of frit coating FIG. 4 is a sectional view showing a preferred embodiment, of a transmission-type X-ray tube according to the present invention, in which a beryllium window preliminarily soldered to a 476-alloy's rim and an accelerating pole provided with a titanium target preliminarily welded to a 476 alloy's support was mounted on a lead-glass bulb at a time by the frit coating, respectively.

[Description of Reference Numerals]
9. Beryllium window
20. 476-alloy's rim
21. 476-alloy's ring
22. Titanium target
23. 476-alloy's support
29. Accelerating pole
18. Lead-glass bulb
25. Barium getter 26. Electron gun
27. Nickel pin
28. Exhaust tube
19. Frit seal
14. Soldering
19. Lead-glass coating or frit coating A method of producing a frit-sealed X-ray tube using two kinds of glass according to the present invention will be below in detail described. At first, one of them is a method using Kovar glass which has been most frequently used for the X-ray tube at present while the other of them is a method using lead glass which has been widely used for the bulb for use in a television brown tube. And, it was confirmed that one kind of the conventional nickel-cobalt iron alloys called Kovar is suitable for the Kovar glass as a sealing part used for jointing glass parts to metallic parts and one kind of nickel chromiron alloys called the 426 alloy or 476 alloy for the lead glass.

And, said glasses and metals to be welded to each other are not heated together by a powerful fire differently from the conventional method but a pasty or solid frit material is still placed within a furnace so as to be inserted between the glasses and the metals with flowing a suitable quantity of inert gas in order to prevent the metallic parts from being oxidized and slowly rise a temperature within said furnace to about 450°–500° C. followed by holding at that temperature about 30 minutes and then slowly cooled. Thus, said frit materials mainly comprising lead oxide and the like are completely glassified to achieve a frit coating between the metallic parts and the glass bulb.

Furthermore, since the Kovar glass and the lead glass as the frit materials used in this frit-coating process are different from each other in thermal expansion coefficient, the frit materials are preliminarily and optimally prepared so as to be remarkably close to the respective glasses in thermal expansion coefficient after a glassification thereof.

Still further, if a shallow groove is provided on a joint surface between the sealing parts made of the Kovar alloy or the 476-alloy and the glass bulb, as shown in FIGS. 3, 4, to preliminarily glaze powders of the Kovar glass or the lead glass in said groove, whereby forming a glass coating, or a coating is adapted to be formed by the glassification of the frit, in the case where a useful life time of the X-ray tube comes to an end in future, the beryllium window, which is expensive and has the possibility of the toxity when mishandled, can be reused.

That is to say, glass portions of the X-ray tube, of which useful life time came to an end, are broken to pieces and a frit-coated surface of the Kovar rim or the 476-alloy's rim, to which the expensive beryllium window is soldered, is subjected to a light planar grinding to remove adhered glass pieces and simultaneously the surface of the glasses formed in the groove or the glassified frit is cleaned or regenerated smoothly, whereby the re-frit coating to the new glass bulb can be achieved.

By the way, although merely the use of the Kovar glass or the lead glass was described in the present invention, it is also expected that stainless steels approximate to pyrex glasses in thermal expansion coefficient are popularized in the near future, so that it is natural that also the frit materials suitable for them are prepared and thus the range, within which the present invention can be applied, can be further expanded.

In short, the key point of the present invention consists in that it is sufficient to use frits preliminarily having the optimal composition so as to make the glasses and the metals, which are to be welded, approximate to each other in thermal expansion coefficient and make said frits welded to both the glasses and the metals without a difficulty to be glassified remarkably approximate to both the glasses and the metals in thermal expansion coefficient. Therefore, there is the possibility that the frit materials are not limited by the Kovar glass and the lead glass.

I claim:

1. A frit-sealed x-ray tube comprising:

a glass bulb;

metallic parts, including an anode with a target, and a beryllium window;

joint materials comprising metals with thermal expansion coefficients which approximate the thermal expansion coefficient of said glass bulb; and frit materials comprising compositions of primarily zinc oxide and lead oxide, said compositions having a thermal expansion coefficient that approximates the thermal expansion coefficients of said glass bulb and said joint materials, said frit materials allowing a heat resistant and vacuum resistant welding between said glass bulb and said joint materials.

* * * * *